United States Patent [19]

Mizuguchi et al.

[11] Patent Number: 5,190,586
[45] Date of Patent: Mar. 2, 1993

[54] PIGMENT COMPOSITE PARTICLES PREPARED BY SUSPENSION POLYMORIZATION

[75] Inventors: Katsumi Mizuguchi, Ibaraki; Masanori Ohiwa, Toyonaka; Keizou Ishii, Ashiya; Shinichi Ishikura, Tsuzuki, all of Japan

[73] Assignee: Nippon Paint Co., Ltd., Osaka, Japan

[21] Appl. No.: 618,370

[22] Filed: Nov. 28, 1990

[30] Foreign Application Priority Data

Nov. 28, 1989 [JP] Japan .................................. 1-308229

[51] Int. Cl.$^5$ ............................................ C08L 101/02
[52] U.S. Cl. ..................................... 106/499; 106/400; 106/401; 106/404; 106/410; 106/419; 106/425; 106/427; 106/432; 106/452; 106/455; 106/456; 106/461; 106/472; 106/493; 106/496; 106/497; 106/498; 523/200; 523/205; 523/207; 523/210; 523/334
[58] Field of Search ............... 523/200, 205, 207, 210, 523/334; 106/400, 401, 499

[56] References Cited

U.S. PATENT DOCUMENTS

| | | | |
|---|---|---|---|
| 3,544,500 | 12/1970 | Osmond et al. | 427/213.3 |
| 3,806,464 | 4/1974 | Matrick et al. | 523/205 |
| 3,876,603 | 4/1975 | Makhlouf | 523/210 |
| 4,608,401 | 8/1986 | Martin | 524/413 |
| 4,846,893 | 7/1989 | Akasaki et al. | 106/500 |
| 4,855,209 | 8/1989 | Martin et al. | 430/126 |
| 4,954,412 | 9/1990 | Breton et al. | 430/137 |
| 5,013,630 | 5/1991 | Ong et al. | 430/138 |

FOREIGN PATENT DOCUMENTS 52329 1/1967 Luxembourg .

OTHER PUBLICATIONS

Chemical Abstracts, vol. 85, 1976, p. 107, abstract No. 79790u, Columbus Ohio, US; & JP-A-76 10 887 (Nippon Synthetic Chemical Industry Col. Ltd.) 28-0-1-1976.

Primary Examiner—Mark L. Bell
Assistant Examiner—Scott L. Hertzog
Attorney, Agent, or Firm—Wenderoth, Lind & Ponack

[57] ABSTRACT

Disclosed are pigment composite particles which are superior in water resistance, weather resistance, thermal stability and hardness. The pigment composite particles are prepared by suspension-polymerizing an aqueous suspension comprising
(a) a pigment paste comprising pigment and a pigment grinding resin having a hydrophilic group of at least 0.2 mmol/g,
(b) a polymerizable monomer and
(c) a polymerization initiator.

11 Claims, No Drawings

PIGMENT COMPOSITE PARTICLES PREPARED BY SUSPENSION POLYMORIZATION

FIELD OF THE INVENTION

The present invention relates to pigment composite particles which are suitable for a coloring agent, a matting agent, a ultraviolet absorber and a weather-resistant polymer pigment.

BACKGROUND OF THE INVENTION

Resin particles which contain pigment have been proposed and employed for a coloring agent, a matting agent, a ultraviolet absorber and a weather-resistant polymer pigment.

Japanese Kokai Publication 188419/1985 discloses epoxy particles which are prepared by preparing an epoxy resin emulsion containing organic or inorganic particles and adding an amine curing agent to cure. The obtained particles, however, have poor water resistance, because they contain a large amount of amino groups. The epoxy resin for the particles also is associated with yellowing problems. Further, if the epoxy resin is alicyclic, it has poor reactivity and does not impart sufficient crosslinking degree, resulting in many problems in hardness, thermal stability and fracture resistance.

Japanese Kokai Publication 131050/1987 discloses colored resin particles for vinyl chloride resin, which are prepared by mixing polyvinyl choloride particles with a coloring paste in the presence of a plasticizer and then adding an acryl resin emulsion therein, followed by The pigment grinding resin preferably has a hydrophobic portion in order to attract and keep the polymerizable monomer (b). However, since most of the pigment grinding resins have vinyl backbones or other hydrophobic portions, the hydrophobic properties are not cared so much. If the resin does not contain the hydrophobic portion, it should be introduced into the resin. Examples of the hydrophobic portions are an alkyl group having more than 3 pl carbon atoms and the like. The introduction of the hydrophobic portion is known to the art. The pigment grinding resin of the present invention more preferably has a glass transition temperature of $-20°$ to $100°$ C., a solubility parameter of 9 to 12 and a number average molecular weight (Mn) of 2,000 to 100,000. If the resin is within the above range, the dispersibility of the pigment keeps good.

The pigment grind resin can be prepared by art-known methods and its backbone can also be anyone which is known to the art, including vinyl polymer, polyester, polyamide, polyether and the like. Preferred is vinyl polymer which is prepared by polymerizing hydrophilic group-containing monomers and other co-polymerizable monomers in the presence of a polymerization initiator. The monomers can be selected from the list of the polymerizable monomer (b) infra, in which polyethylenic monomers are excluded, and the polymerization initiator is also selected from the polymerization initator (c) infra. An amount of the The pigment grinding resin preferably has a hydrophobic portion in order to attract and keep the polymerizable monomer (b). However, since most of the pigment grinding resins have vinyl backbones or other hydrophobic portions, the hydrophobic properties are not cared so much. If the resin does not contain the hydrophobic portion, it should be introduced into the resin. Examples of the hydrophobic portions are an alkyl group having more than 3 carbon atoms and the like. The introduction of the hydrophobic portion is known to the art. The pigment grinding resin of the present invention more preferably has a glass transition temperature of $-20°$ to $100°$ C., a solubility parameter of 9 to 12 and a number average molecular weight (Mn) of 2,000 to 100,000. If the resin is within the above range, the dispersibility of the pigment keeps good.

The pigment grind resin can be prepared by art-known methods and its backbone can also be anyone which is known to the art, including vinyl polymer, polyester, polyamide, polyether and the like. Preferred is vinyl polymer which is prepared by polymerizing hydrophilis group-containing monomers and other co-polymerizable monomers in the presence of a polymerization initiator. The monomers can be selected from the list of the polymerizable monomer (b) infra, in which polyethylenic monomers are excluded, and the polymerization initiator is also selected from the polymerization initiator (c) infra. An amount of the polymerization initiator is within the range of 0.3 to 5 % by weight based on the total weight of the monomers. The polymerization is conducted at a temperature of 100 to 130 ° C. for 2 to 10 hours. The polymerization may be conducted in a solvent if necessary. Examples of the solvents are water soluble solvents or water insoluble solvents, such as xylene, dioxane, butyl acetate, n-butanol and the like. The obtained vinyl polymer may be neutralized with an acid compound or basic compound, if necessary. If the hydrophilic group is acidic, the neutralizing agent is the basic compound, such as triethylamine, dimethylethanolalmine and the like. If the hydrophilic group is basic, the neutralizing agent is the acid compound, such as acetic acid, propionic acid, hydrochloric acid, sulfonic acid, sulfuric acid and the like. The neutralization may be conducted during the suspension polymerization of the pigmented particle of the present invetion.

The pigment paste (a) of the present invention is generally prepared by mixing the above mentioned pigment grinding resin, a pigment and if necessary a solvent in the presence of glass beads, steel beads and the like. Examples of the pigments are those used for paint, for example an inorganic pigment, such as zinc white, titanium oxide, antimony white, carbon black, iron black, iron red, aluminum, cadmium yellow, zinc sulfate, calcium sulfate, lead sulfate, barium carbonate, white lead and alumina white; an organic pigment, such as an azo compound, a phthalocyanine, a thioindigo, an anthraquinone, a flavanthrone, an indanthrene, an anthrapyridine, a pyranethrone, an isoindolinone, a perylene, a perinone and a quinacridone; and the like. Examples of the solvents are butyl acetate, xylene, toluene, butanol, methyl ethyl ketone, isobutyl ketone and the like.

In the pigment paste (a), the pigment may be present in an amount of 0.01 to 2.33 parts by weight, preferably 0.03 to 1 part by weight based on one part by weight of the resin grinding resin. The solvent may be present 0 to 3.8 parts by weight, preferably 0.01 to 2.33 parts by weight based on one part by weight of the pigment grinding resin. Amounts of outside the above range reduce the pigment dispersibility or pigment stability of the pigment paste (a).

The polymerizable monomer (b) employed in the present invention is not limited, including a carboxylic group containing polymerizable monomer, such as acrylic acid, methacrylic acid, crotonic acid, itaconic acid, maleic acid and fumaric acid; an alkyl ester of the carboxylic group containing monomer, such as methyl acrylate, methyl methacrylate, ethyl acrylate, ethyl methacrylate, n-butyl acrylate, n-butyl methacrylate and ethylhexyl acrylate; a hydroxyl group-containing monomer, such as 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol and methallyl alcohol; a polymerizable amide, such as acrylamide and methacrylamide; a polymerizable nitrile, such as acrylonitrile and methacrylonitrile; glycidyl (meth)acrylate; an aromatic vinyl compound, such as styrene, vinyl toluene and t-butylstyrene; an alpha-olefin, such as ethylene and propylene; a vinyl compound, such as vinyl acetate and vinyl propyonate; a diene compound, such as butadiene and isoprene; and the like.

In addition to the above mentioned polymerizable monomer, a polyethylenic monomer may be employed to enhance organic solvent resistance. The polyethylenic monomers are monomers having at least two $\alpha,\beta$-unsaturations, such as unsaturated carboxylic ester of polyhydric alcohols, unsaturated alcohol esters of polybasic acids and aromatic compounds substituted at least two polymerizable groups. Examples of the polyethylenic monomers are ethylene glycol di(meth)acrylate, triethylene glycol di(meth)acrylate, tetraethylene glycol di(meth)acrylate, 1,3-butylene glycol di(meth)arylate, trimethylolpropane tri(math)acrylate, 1,4-butanediol di(meth)acrylate, neopentyl glycol di(meth)acrylate, 1,6-hexanediol di(meth)acrylate, pentaerythrtol di(meth)acrylate, pentaerythritol tri(meth)acrylate, pentaerythritol tetra(meth)acrylate, glycerol di(meth)acrylate, glycerol acroxy di(meth)acrylate, 1,1,1-trishydroxymethylethane di(meth)acrylate, 1,1,1-trishydroxymethylethane tri(meth)acrylate, 1,1,1-trishydroxymethylpropane di(meth)acrylate, 1,1,-trishydroxymethylpropane tri(meth)acrylate, triallyl cyanulate, triallyl isocyanulate, triallyl trimellitate, diallyl terephthalate, diallyl phthalate, divinyl benzene and the like. The polyethylenic monomer may be present in an amount of 0 to 80 % by weight, preferably 5 to 50 % by weight based on the total monomer amount.

The polymerization initiator (c) of the present invention is not limited including those used for suspension polymerization. Examples of the initiators are an azo compound, such as azobisisobutylonitrile, 2,2'-azobis(4-methoxy-2,4-dimethylvaleronitrile), dimethyl-2,2'-azobisisobutyrate), 2,2'-azobis(2-cyclopropyl propionate), 2,2'-azobis(2,4-dimethylvaleronitrile), 2,2'-azobis(2-methylbutylonitrile), 1,1'-azobis(cyclohexane-1-carbonitrile), 2-phenylazo-4-methoxy-2,4-dimethylvaleronitrile, azodi-t-octane, azodi-t-butane, dimethyl-2,2'-azobisisobutylate and the like; an alkyl perester, such as 2,4,4-trimethylpentyl peroxyphenoxyacetate, alpha-cumylperoxy neodecanoate, t-butylperoxy neodecanoate, t-butylperoxy pivalate, t-butylperoxy-2-ethylhexanoate, t-butylperoxy isobutylate, di-t-butylperoxy hexahydroterephthalate, di-t-butylperoxy azelate, t-butylperoxy-3,5,5-trimethyl hexanoate, t-butylperoxy acetate, t-butylperoxy benzoate, di-t-butylperoxy trimethyladipate and the like; a percarbonate compound, such as di-3-methoxybutylperoxy dicarbonate, di-2-ethylhexylperoxy dicarbonate, bis(4-t-butylcyclohexyl)peroxy dicarbonate, diisopropylperoxy dicarbonate, di-sec-butylperoxy dicarbonate, t-butylperoxyisopropyl carbonate and the like; and a mixture thereof.

In the suspension polymerization of the present invention, an amount ratio of the pigment paste (a) / the polymerizable monomer (b) is within the range of 2/98 to 0/50, preferably 5/95 to 30/70. Amount ratios of less than 98 provide poor coloring power and those of more than 0/50 do not form particles. The polymerization initiator (c) is present in an amount of 0.1 to 5 % by weight based on the total monomer amount. Amounts of less than 0.1 % by weight do not provide sufficient polymerization degree and those of more than 5 % by weight increase low molecular weight products.

In the suspension polymerization, in addition to the above components, a dispersion stabilizer may be added to the mixture in order to enhance stability of the suspension. Typical examples of the dispersion stabilizers are organic stabilizers, such as polyvinyl acetate or a modifier thereof (e.g. polyvinyl alcohol), polyvinyl pyrrolidone, and a polymer dispersant having a hydrophilic groups and a hydrophobic groups; and inorganic stabilizers, such as calcium salts (e.g. calcium phosphate and calcium carbonate) and magnesium salts. The dispersion stabilizer may be present in the suspension in an amount of 0 to 10 % by weight. Amounts of more than 10 % by weight reduce the particle size of the obtained pigment composite particles and make it difficult to remove the stabilizer in a rinsing step.

An aqueous medium of the suspension is basically composed of water, but an water-soluble organic solvent (e.g. alcohols, ketones and the like) may be added. An amount of the aqueous medium is 1.5 to 19 parts by weight, preferably 2.3 to 9 parts by weight based on one part by weight of the total amount of the components (a), (b) and (c). Amounts of less than 1.5 parts by weight do not provide stable suspension and may arise gelation. Amounts of more than 19 parts by weight reduce the producing amount of the pigment composite particles of the present invention.

The pigment composite particles of the present invention may be prepared by mixing the above three components (a), (b) and (c) to which the aqueous medium is added gradually to form a uniform suspension, and then suspension polymerizing at 40° to 95 ° C., preferably 60° to 85° C. for 1 to 24 hours, preferably 2 to 12 hours. The obtained particles can be isorated from the suspension by, for example, filtering, rinsing and drying. The obtained pigment resin particles generally have an average particle size of 3 to 300 micrometer.

Although not limit to a particular theory in ordinary suspension polymerization, monomers form particles in the suspension and are polymerized. In the present invention, it would be considered that the suspended monomer particles are covered with the pigment grinding resin which carries pigment particles and then polymerized as they are. Since the pigment is present outside the obtained particles, the coloring power is strong as much as the pigment itself and the pigment composite particles show high hiding power. The pigment composite particles have higher hiding power than an ordinary matting agent (e.g. silica).

In the preparation of the present invention, since it is not necessary to formulate an emulsifying agent, the obtained particles are superior in water resistance and weather resistance to those obtained by conventional processes wherein an emulsifying agent is employed. The pigment composite particles contain thereon free hydrophilic groups which are derived from the pigment grinding resin. The free hydrophilic groups, especially carboxyl groups, may be modified with a compound having other reactive groups, such as hydroxyl group containing alkyl compounds to make the surface hydrophobic.

EXAMPLES

The present invention is illustrated by the following Examples which, however, are not construed as limiting the present invention to their details.

as MA-480 g of butyl acetate and 1,000 cc of steal beads and ground to obtain a pigment paste having a particle size of less than 5 micrometer.

Preparation Examples 2 to 6

Pigment pastes were prepared as generally described in Preparation Example 1, with the exception that the ingredients as shown in Table 1 were employed. Amounts of the hydrophilic groups also were determined and the results are shown in Table 1.

TABLE 1

| | Preparation examples | | | | |
|---|---|---|---|---|---|
| | 2 | 3 | 4 | 5 | 6 |
| Monomers for the pigment grinding resin (parts by weight) | MMA[1] (120) ST[2] (80) MAA[3] (24) EHMA[4] (116) HEMA[5] (60) | MMA (80) LMA[6] (80) nBA[7] (80) iBMA[8] (120) IAnh[9] (40) | iBA[10] (80) ST (160) EHMA (136) AA[11] (12) MAN[12] (12) | MMA (80) DMAPMA[13] (20) MAA (20) nBA (120) EHA[14] (160) | MMA (120) ST (120) MAA (5) EHMA (120) iBA (35) |
| Polymerization initiator (parts by weight) | t-Butylperoxy-2-ethyl hexanoate (10) | Azobisisobutylonitrile (4) | t-Butylperoxy-2-ethyl hexanoate (12) | Azobisisobutylonitrile (6) | Azobisisobutylonitrile (6) |
| Modification and neutralization (parts by weight) | TPA[15] (40.7) | DEDAP[16] (11.6) DMEA[17] (31.8) STA[18] (72.2) | DEDAP (15.9) DMEA (14.8) TEA[19] (12.4) | DMEA (20.7) | TPA (8.3) |
| Pigment (parts by weight) | Cyanine blue NK[20] (100) | Mapico yellow-LL-XLO[21] (171) | Pariogen red 3910[22] (44) | MA-100[23] (70) | MA-100 (70) |
| Solvent (parts by weight) | Dioxane (400) | Xylene/Butyl acetate = 1/1 (720) | n-Butanol/Butyl acetate = 1/4 (480) | Xylene (500) | Xylene (500) |
| Hydrophilic group amount (mmol/g) | 1.85 | 0.923 | 0.990 | 0.876 | 0.145 |
| Molecular weight (Mn) | 6,200 | 9,300 | 4,900 | 6,900 | 7,000 |

[1] Methyl methacrylate
[2] Styrene
[3] Methacrylic acid
[4] 2-Ethylhexyl methacrylate
[5] 2-Hydroxyethyl methacrylate
[6] Lauryl methacrylate
[7] n-Butyl acrylate
[8] i-Butyl methylacrylate
[9] Itaconic anhydride
[10] i-Butyl acrylate
[11] Acrylic acid
[12] Maleic anhydride
[13] Dimethyl aminopropyl methacrylamide
[14] Ethylhexyl acrylate
[15] Tripropylamine
[16] N,N-Dimethyldiaminopropane
[17] Dimethylethanol amine
[18] Stearylamine
[19] Triethylamine
[20] Dainippon Inc. & Chemicals Inc.
[21] Titanium Industries Co., Ltd.
[22] BASF AG
[23] Mitsubishi Carbon Co., Ltd.

Preparation Example 1

A reaction vessel equipped with a thermometer, a stirrer, a dropping funnel and a nitrogen gas introducing tube was charged with 150 g of xylene and 200 g of butyl acetate and heated to 105° C. A mixture of 92 g of styrene, 140 g of methyl methacrylate, 20 g of n-butyl acrylate, 116 g of 2-ethylhexyl methacrylate and 32 g of itaconic anhydride was added to the reaction vessel for 3 hours. A mixture of 6 g of t-butylperoxy-2-ethyl hexanate and 50 g of xylene was simultaneously added thereto for 3 hours. After the completion of the addition, it was aged for 2 hours at 105° C. To the content, 38.5 g of stearylamine was added and reacted for one hour to obtain a copolymer having a number average molecular weight of 8,000 and a solid content of 51.5 % by weight. The obtained copolymer had a hydrophilic group of 0.844 mmol/g by a titration method. The obtained polymer was neutralized with 50.8 g of dimethylethanolamine.

The obtained polymer was mixed with 168 g of carbon black (available from Mitsubishi Carbon Co., Ltd.

EXAMPLE 1

Ten gram of the black pigment paste of Preparation Example 1 was mixed with 30 g of styrene, 20 g of methyl methacrylate, 10 g of n-butyl acrylate and 40 g of ethyleneglycol dimethacrylate, to which one gram of 2,2'-azobis(2-methylpropylnitrile) was added. Then, 900 g of deionized water was added thereto and homogenized to form a suspension.

The suspension was heated to 80° C for 30 minutes and polymerized for 6 hours. The obtained dispersion had a nonvolatile content of 11 % by weight. It was then filtered and dried to obtain pigment composite particles having an average particle size of 40 micrometer.

EXAMPLES 2 to 5

The pigment composite particles were obtained as generally described in Example 1, with the exception that ingredients and conditions as shown in Table 2 were employed. A nonvolatile content of the suspension and an average particle size of the obtained resin particles were determined and are shown in Table 2.

COMPARATIVE EXAMPLE 1

Ten gram of the black pigment paste of Preparation Example 6 was mixed with 30 g of styrene, 20 g of methyl methacrylate, 10 g of n-butyl acrylate and 40 g of ethyleneglycol dimethacrylate, to which one gram of 2,2'-azobis(2-methylpropylnitrile) was added. Then, 900 g of deionized water was added thereto and homogenized to form a suspension.

The obtained suspension was heated as described in Example 1, but resin particles were not obtained.

transition temperature of −20° to 100° C., a solubility parameter of 9 to 12 and a number average molecular weight (Mn) of 2,000 to 100,000.

5. The pigment composite particles according to Claim 1 wherein said pigment paste (a) is prepared by mixing said pigment grinding resin, a pigment and a solvent.

6. The pigment composite particles according to Claim 5 wherein said pigment is present in an amount of 0.01 to 2.33 parts by weight based on one part by weight of said resin grinding resin, and said solvent is present 0 to 3.8 parts by weight based on one part by weight of said pigment grinding resin.

7. The pigment composite particles according to

TABLE 2

| | Examples | | | |
|---|---|---|---|---|
| | 2 | 3 | 4 | 5 |
| Pigment paste No. (g) | Preparation ex. 2 (15) | Preparation ex. 3 (10) | Preparation ex. 4 (15) | Preparation ex. 5 (10) |
| Styrene | 40 | 50 | 30 | 25 |
| Methyl methacrylate | 15 | 30 | 30 | 40 |
| n-Butylacrylate | 15 | 20 | 10 | 5 |
| Ethylene glycol dimethacrylate | 30 | — | — | — |
| Divinyl benzene | — | — | 30 | — |
| Neopentyl glycol dimethacrylate | — | — | — | 30 |
| Polymerization initiator (g) | 2-Azobis(2,4-dimetyl-valeronitrile (1) | t-Butylperoxy-2-ethyl hexanate (1) | 2,2-Azobis-isobutyl-nitrile (0.5) | t-Butylperoxy-2-ethyl hexanate (1) |
| Aqueous medium (g) | Deionized water (400) | Deionized Water (900) | Deionized water (400) | Deionized Water (900) + Acetic acid (7.1) |
| Heating time (minute) | 30 | 30 | 30 | 30 |
| Polymerization temperature (°C.) | 60 | 80 | 60 | 80 |
| Polymerization time (h) | 6 | 6 | 6 | 6 |
| Nonvolatile content (%) | 22 | 11 | 19 | 11 |
| Average particle size (μm) | 3 | 20 | 3 | 5 |

What is claimed is

1. Pigment composite particles having an average particle size of 3 to 300 micrometers prepared by suspension-polymerizing an aqueous suspension comprising:
   (a) a pigment paste comprising a pigment and a pigment grinding resin having a hydrophilic group therein of at least 0.2 mmol/g,
   (b) a polymerizable monomer and
   (c) a polymerization initiator; wherein said pigment is located on the outside of the composite pigment particles.

2. The pigment composite particles according to claim 1 wherein said pigment grinding resin is a vinyl polymer having carboxyl groups.

3. The pigment composite particles according to claim 1 wherein said pigment grinding resin has a hydrophilic group of 0.5 to 6.0 mmol/g.

4. The pigment composite particles according to claim 1 wherein said pigment grinding resin has a glass claim 1 wherein said polymerizable monomer (b) further contains a polyethylenic monomer.

8. The pigment composite particles according to claim 1 wherein an amount ratio of said pigment paste (a) / said polymerizable monomer (b) is within the range of 2/98 to 50/50.

9. The pigment composite particles according to claim 1 wherein said polymerization initiator (c) is present in an amount of 0.1 to 5 % by weight based on the total monomer amount.

10. The pigment composite particles according to claim 1 wherein said suspension further contains a dispersion stabilizer.

11. The pigment composite particles according to claim 1 wherein said aqueous suspension contains an aqueous medium of 1.5 to 19 parts by weight based on one part by weight of the total amount of the components (a), (b) and (c).

* * * * *